United States Patent
Lehto et al.

(10) Patent No.: US 6,909,904 B2
(45) Date of Patent: Jun. 21, 2005

(54) SYSTEM AND PROTOCOL FOR EXTENDING FUNCTIONALITY OF WIRELESS COMMUNICATION MESSAGING

(75) Inventors: Johannes Lehto, Virsutie (FI); Kimmo Hämynen, Kuunsäde (FI)

(73) Assignee: Nokia Corporation, Espoo (FI)

( * ) Notice: Subject to any disclaimer, the term of this patent is extended or adjusted under 35 U.S.C. 154(b) by 728 days.

(21) Appl. No.: 09/864,855

(22) Filed: May 23, 2001

(65) Prior Publication Data

US 2002/0177455 A1 Nov. 28, 2002

(51) Int. Cl.$^7$ ................................................. H04Q 7/20

(52) U.S. Cl. .................... 455/466; 455/414.1; 370/473; 370/474; 370/394

(58) Field of Search ................................ 455/403, 466; 370/474, 476, 394, 465, 473

(56) References Cited

U.S. PATENT DOCUMENTS

| | | | | |
|---|---|---|---|---|
| 5,629,940 A | * | 5/1997 | Gaskill ........................ | 370/311 |
| 6,044,248 A | * | 3/2000 | Mochizuki et al. ......... | 340/7.47 |
| 6,314,100 B1 | * | 11/2001 | Roach et al. ................ | 370/394 |
| 6,445,396 B1 | * | 9/2002 | Suzuki ........................ | 345/636 |
| 2001/0049289 A1 | * | 12/2001 | Kim ............................ | 455/466 |
| 2002/0177454 A1 | * | 11/2002 | Karri et al. .................. | 455/466 |

FOREIGN PATENT DOCUMENTS

| | | |
|---|---|---|
| EP | 1 039 768 A2 | 3/2000 |
| EP | 1 091 601 A2 | 11/2001 |
| WO | WO 97/30556 | 8/1997 |
| WO | WO 98/03026 | 1/1998 |
| WO | WO 00/35214 | 6/2000 |

OTHER PUBLICATIONS

Peersman, G., Cvetkovic, S., Griffiths, P. and Spear, H., The Global System for Mobile Communications Short Message Service, IEEE Personal Communications, Jun. 2000, pp. 15–23.

Global System for Mobile Communications, Digital Cellular Telecommunications System (Phase 2 + ); Technical Realization of the Short Message Service (SMS), Point–to–Point (PP), (GSM 03.40), GSM Technical Specification, Jul. 1996, Section 9.2.3.

Digital cellular telecommunications system (Phase 2 +); Technical realization of the Short Message Service (SMS); Point–to–Point (PP) (GSM 03.40 version 5.6.1); Jan. 1998; ETSI; pp. 1–90.

Mobile Originated short message transfer; ETS 300 901 (GSM 03.40 version 5.6.1): Jan. 1998; pp. 91–115.

* cited by examiner

Primary Examiner—Nay Maung
Assistant Examiner—Sujatha Sharma
(74) Attorney, Agent, or Firm—Ware, Fressola, Van Der Sluys & Adolphson LLP

(57) ABSTRACT

An apparatus and method for extending the functionality of a message according to a predetermined message format, such as the Short Message Service (SMS) format, communicated at least in part via a wireless communication system, the method including the steps of: determining a number of bits to be used for conveying extension data indicating instructions associated with displaying the message; defining the information to be conveyed by each bit; and inserting the extension data into the message at the end of a user data field of the message. The method thus provides an extension to the messaging according to the predetermined format, an extension that is effective for mobile terminals adapted to interpret the extension data but that does not prevent mobile terminals not so adapted from displaying the message without regard for the instructions indicated by the extension data.

14 Claims, 3 Drawing Sheets

SYSTEM AND PROTOCOL FOR EXTENDING FUNCTIONALITY OF WIRELESS COMMUNICATION MESSAGING

FIELD OF THE INVENTION

The present invention relates to providing messages in the form of at least text and pictures from one mobile terminal to another using for example the so-called Short Message Service (SMS). More particularly, the present invention relates to extending the functionality of wireless communication messaging, such as SMS-based picture messaging, so that for example a sequence of related SMS picture messages in a predetermined order can be provided to or from a mobile terminal, the extending being accomplished in such a way that a mobile terminal that is compatible with SMS-based picture messaging can interpret at least a part of a message conveyed according to the invention.

BACKGROUND OF THE INVENTION

In recent years, data services have become popular for mobile communications systems, including the very popular so-called short messaging service (SMS), which makes use of underutilized bandwidth of signaling channels to allow short text messages. With SMS, users are able to exchange alphanumeric messages (up to 160 characters in length), and the messages are delivered within seconds of their being transmitted. Of course the networks traversed in providing the messages from one user to another must all be digital cellular networks. Although SMS was originally conceived as a paging mechanism for notifying users of the arrival of voicemail, it is now used primarily as a messaging service. A new use for SMS is a picture messaging application for cellular telephones that is proprietary mobile telephone (e.g., Nokia 3210 GSM) and send them to another, like proprietary telephone (another Nokia 3210 or a Nokia 8210 or Nokia 8850). With a likewise proprietary messaging platform (e.g., Nokia Artus Messaging Platform), operators are able to enhance usage of Short Message Service (SMS) for their subscribers. Such a simple graphic message service provides a black-and-white picture, for instance 72×28 pixels, along with a short greeting displayed below the picture. A maximum size of the greeting is specified, for example 120 characters.

The picture messaging now available with SMS allows greater expression in some respects than pure text. However, a single picture and associated text tends to be too limiting for conveying even quite simple communications. What is needed is a mechanism that builds on the notion of providing a message as a picture and associated text, such as a mechanism that allows sending several such pictures and associated text.

With conventional SMS, if a user wishes to send a series of pictures that in combination convey a message, however, the user must pay for each picture and associated text as a separate and distinct SMS message. In addition, for a sender to send to a recipient an ordered sequence of pictures and associated text, what is here called a funny (as in the so-called funnies of the comics section of some newspapers), the sender must repeat the action required to send the first picture and text for each subsequent picture and text. In other words, the procedure for sending a funny is awkward, including various repetitious acts on the part of the sender. The situation is no less awkward on the receiving side. Moreover, there is no guarantee that on the receiving side the individual SMS messages making up a funny will arrive in the order in which they were sent.

It is known in the art to download actual comic strips from wireless application protocol (WAP) sites, but downloading such comic strips is not a way to provide a message consisting of a sequence of pictures in associated text; the downloaded comics cannot be personalized and sent to a user of another mobile terminal as a single message. Besides, for a mobile telephone to be able to download WAP comics, the mobile telephone must have software designed specifically for that purpose.

An application co-filed with the present application and owned by the owner of the present application discloses a type of message that addresses the needs left unfulfilled by the prior art. The type of message disclosed there includes a plurality of linked frames, each frame including either text or a picture or both, so that a single message consists of a sequence of frames, in the order in which they are linked together. A sender sends such a message as a single, unified message, rather than as three individual SMS picture messages. Correspondingly, and a receiver of such a message is able to view the message, usually frame-by-frame (although future equipment might allow for viewing all of the frames at the same time), save it, and use it as a basis for a message the recipient would later create and send to a third party. The co-filed application does not, however, indicate any particular mechanism by which the individual frames of the sequential-frame message, called a funny (as in the funnies or comics of some newspapers), would be linked together so that sending and receiving equipment is able to refer to the message and manipulate it as a unified entity.

What is needed is a mechanism for linking together the frames of a funny (a sequence of frames of pictures and associated text) so that the funny can be manipulated (viewed, edited, sent and received) as a single entity by a mobile station, preserving the order of the individual frames of the funny. Ideally, such a mechanism would allow existing equipment to properly manipulate a funny, or at least part of a funny, rather than simply signaling to the user of the equipment that a message (of some sort) has been received but cannot be displayed.

SUMMARY OF THE INVENTION

Accordingly, the present invention provides an apparatus and corresponding method for extending the functionality of a message according to a predetermined message format, for use when communicating one or more messages at least in part via a wireless communication system from a sending terminal to a receiving terminal, either of which may be a mobile terminal, the message format providing a user data field, the method including the steps of: determining a number of bits at the end of the user data field to be used to convey extension data; defining the information to be conveyed by each bit; inserting extension data into the user data field in the determined number of bits at the end of the user data field; wherein the extension data includes information indicating instructions associated with displaying the message, thereby providing an extension to the messaging according to the predetermined format that is effective for mobile terminals adapted to interpret the extension data but does not prevent mobile terminals not so adapted from displaying the message without regard for the instructions indicated by the extension data.

In a further aspect of the invention, the message format is for a message including a picture and each picture message includes a picture and possibly some associated text, and the method also includes the steps of: inserting into the user data field at least some of the text to be associated with the picture; and inserting at least some of the picture into the user data field after the text.

In another further aspect of the invention, the predetermined message format is the short message service (SMS) picture message format. In some applications in which the predetermined message format is the SMS picture message format, an ordered sequence of SMS picture messages is conveyed as a single message object logically organized into frames, each frame consisting of and conveyed as one or more SMS picture messages, and for frames consisting of only one SMS picture message, the SMS extension data is included after the picture in the only one SMS picture message, but in each frame consisting of multiple SMS picture messages, the SMS extension data is included after the picture in the last SMS picture message of the multiple SMS picture messages making up the frame. In some such applications, in case a frame is conveyed by more than one SMS message, the method also includes the step of inserting SMS message concatenation data into the user data field of each SMS message used to convey the frame so as to indicate the individual SMS messages and their order to be used to convey the frame. Also in some such applications, the SMS extension data includes a message identifier and also the order number or other identifier of the current frame for use by the receiving terminal in ordering the frames of the multi-frame message, and in some of these applications, the SMS extension data further includes the SMS message number of the SMS message to be used to convey a frame too long to be conveyed by a single SMS message.

The invention thus extends the functionality of wireless communication messaging by providing a mechanism for manipulating funnies based on an approach that provides additional data in the existing message structure. An advantage of such an approach is that the mechanism is backwards compatible with existing picture messaging applications. A user can at least send funnies to those existing mobile phones that support picture messaging (e.g. especially Nokia 3210 and 3310, and in addition Nokia 6210, 8210, 8850, and 8890).

A further advantage of an approach based on providing additional data in an existing SMS messaging infrastructure is that it is possible to also provide new value-added features to the existing SMS messaging infrastructure without losing backwards compatibility, and with existing billing and transmitting capabilities. A drawback of the approach is that the actual payload of the message is decreased with the size of the additional data.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

The present invention is a protocol that extends the functionality of SMS-based picture messaging, so that for example a sequence of related SMS picture messages in a predetermined order can be provided to or from a mobile terminal, the extending being accomplished in such a way that a mobile terminal that is compatible with SMS-based picture messaging can interpret at least a part of a message conveyed according to the invention. An ordered sequence of SMS-based picture messages is here called a funny, as explained below. In the case of older mobile terminals, terminals that can interpret and display a single SMS-based picture message but are not programmed according to the protocol of the invention, the invention provides that such terminals will nevertheless be able to display at least part of an SMS-based picture message according to the invention, thereby providing at least partial backwards (toward earlier model mobile terminals) compatibility. The invention, however, is not restricted to making possible the conveying of funnies via SMS messages (in a partially backwards compatible way), but makes possible conveying to a mobile terminal (as opposed to the operator of the mobile terminal) any information or instructions that can be encoded in the byte-budget provided by a particular embodiment of the invention, such as for example instructions that the mobile terminal is to vibrate when displaying a picture message, one that may or may not be a part of a funny. As another example, the invention could be used to provided a key to decrypting encrypted text to accompany a picture. Older mobile terminals could see the picture, but would not read the key for opening the text. Mobile phones adapted to be compatible with the invention would notice the key provided according to the invention, and so would display the text (after decrypting it), if the user provides a correct password when prompted by the mobile terminal.

The invention will, nevertheless first be described in respect to funnies. The use of the invention for conveying to a mobile terminal instructions that extend the functionality of SMS-based picture messages in other regards, besides for providing funnies (described below), will be apparent to those skilled in the art based on the description in respect to funnies.

Background on Funnies

Figure 1:
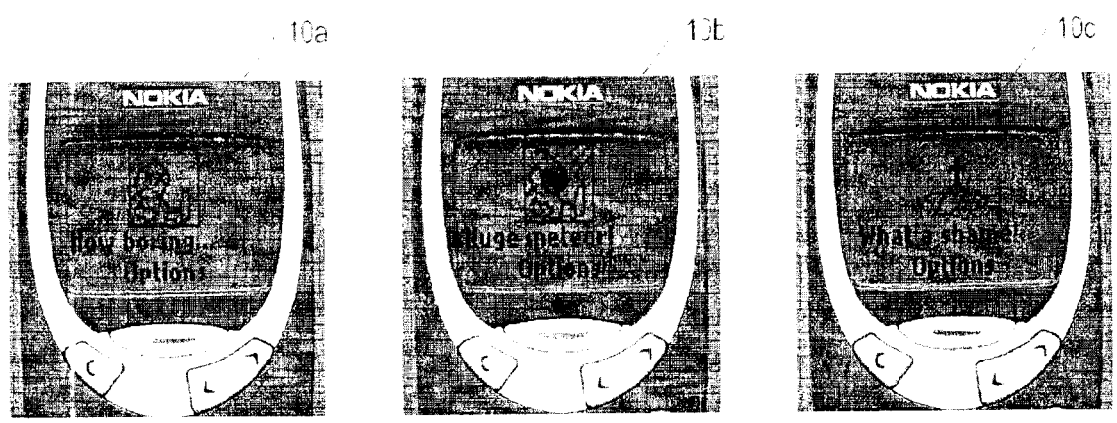
FIG. 1 is an example of a so-called funny being displayed on the screen of a mobile terminal (the pictures being displayed in succession, one at a time, in the illustration given)

Referring now to FIG. 1, according to the invention the display of a mobile terminal can be used to display a sequence of pictures and associated text, each picture and associated text called a frame, that in combination and in a particular order make up a message that can be sent to another mobile terminal. Such an ordered sequence of pictures and associated text make up what is here called a funny, using the term funny in the sense of a comic strip, which usually consists of three individual frames, each frame including a picture and associated text. Thus, FIG. 1 shows a message according to the invention consisting of three frames 10a 10b 10c, the text for the first frame beginning "How boring . . . ," the text for the next frame beginning "Huge meteor!", and so on. A funny according to the invention can also include special effects such as sound and vibration effects, so as to provide messages that can be even more expressive than messages consisting of only text and pictures. Most importantly, according to the invention, the user assembles pictures (usually selecting the pictures from a library of images) and provides associated text so as to create a single, personalized message. Such messages (funnies) can be created and sent using either a mobile terminal or using a desktop or web application, instead of a mobile terminal.

Funnies are preferably implemented based on the existing short message service (SMS) in a way that allows sending and receiving funnies using equipment with the functionality to make use of the SMS picture messaging. As an alternative to the preferred embodiment of sending funnies based on SMS picture messaging, a funny can be sent using wireless application protocol (WAP) bookmarks so that an intended recipient of a funny would download pictures using WAP. The disadvantage of providing funnies based on WAP is that it is likely that the cost to the user would be greater than funnies based on SMS. As a third alternative, a funny can be sent using the so-called multimedia messaging service (MMS).

The Invention

Figure 2:
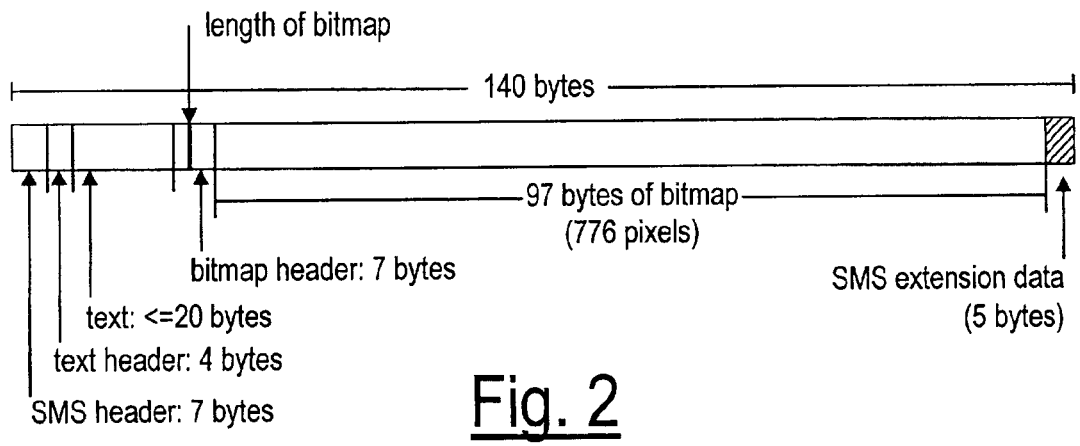
FIG. 2 is a representation of a data structure used to communicate to a mobile phone the organization of the frames of a funny when each frame is short enough to be conveyed by a single SMS message.
Figure 3A:
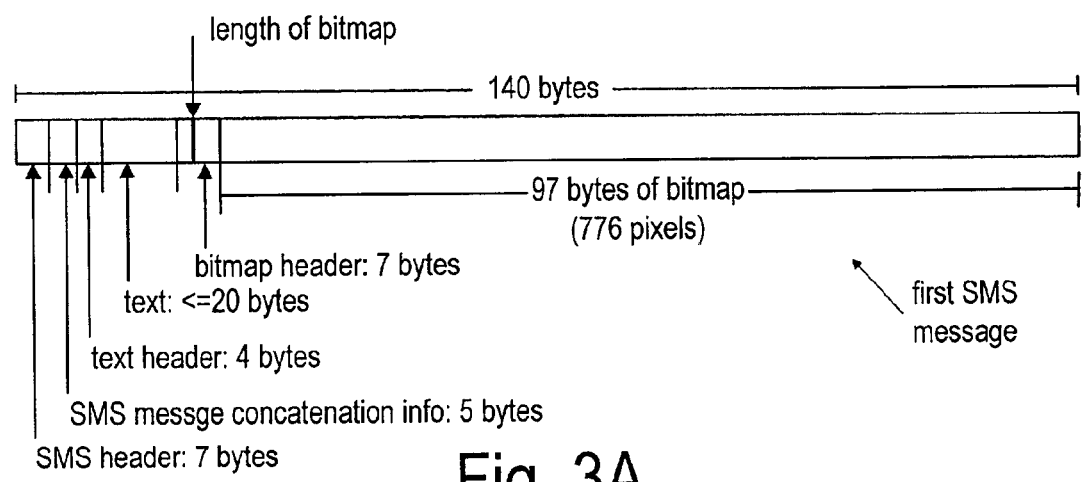
FIGS. 3A–B in combination represent a data structure used to communicate to a mobile phone a frame of a funny when the frame is too long to be conveyed by a single SMS message.
Figure 3B:
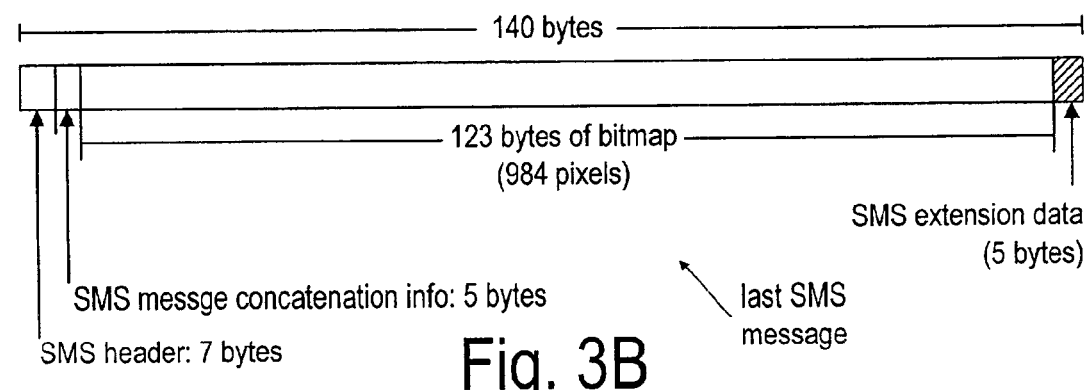

Referring now to FIGS. 2 and 3A–B, a mechanism according to the invention for conveying a funny as a single, unified object to a mobile phone having an SMS capability is shown. The invention encompasses a mechanism in case each frame of a funny can be transmitted as a single SMS message (illustrated in FIG. 2), and also in case a frame of a funny must be transmitted as more than one message (illustrated in FIGS. 3A–B).

Referring now in particular to FIG. 2, a single Transport Protocol User Data (TP-UD) field of an SMS message is shown conveying a frame of a funny in case the entire frame can be conveyed by a single SMS picture message. If all of the frames of the funny are so sized, the full funny is transmitted frame-by-frame, one frame per SMS picture message, by the sending application after the sending application inserts extra data, called here SMS extension data, into the SMS message after the bitmap information used for conveying a picture. (The associated text is conveyed using in the 20 or less bytes indicated as being for text.) The SMS extension data guide the receiving application in how it manipulates (displays and saves) the funny being received. The application understands from the SMS extension data that what is being received is an ordered sequence of frames, each including possibly both a picture and associated text, (i.e. a funny), and for a given SMS picture message conveying a particular frame of the funny, the order in the sequence of the frame being conveyed by the SMS picture message.

Note that section 9.2.3 of Digital cellular telecommunications system (Phase 2+); Technical realization of the Short Message Service (SMS) Point-to-Point (GSM 03.40), indicates a mechanism for concatenating SMS messages. It should be reemphasized that the present invention achieves much more than providing for concatenating SMS-based picture messages, as mentioned above. But in respect to concatenating SMS-based picture messages, the invention allows for having a long frame of a funny, one that must be conveyed by several SMS messages concatenated according to the prior art, and having the long frame be one of several frames concatenated according to the invention.

Referring now to FIGS. 3A–B, if the frame of a funny requires so many bits that it cannot be conveyed by a single SMS picture message, then the SMS extension data are added after the last bitmap information section in the last SMS message being used to convey the frame. As shown in FIG. 3A, the first SMS message of the sequence being used to convey a single frame of a multi-frame funny includes no SMS extension data, but does include standard SMS message concatenation information immediately following the SMS header to indicate that the first SMS message is to be concatenated with one or more subsequent SMS messages, as known in the art and as set out in Section 9.2.3 of Digital cellular telecommunications system (Phase 2+); Technical realization of the Short Message Service (SMS) Point-to-Point (GSM 03.40), hereby incorporated by reference as background. As shown in FIG. 3B, the last SMS message being used to convey a long frame of a funny includes the extra data (5 bytes) added after the bitmap being used to convey the last part of the frame. Thus, with such a mechanism, the concatenating mechanism that is a standard element of the SMS message (i.e. the SMS message concatenation information) works with the SMS extension data of the invention to allow for funnies including frames too long to be conveyed by a single SMS message.

SMS Extension Data for a Funny

In the case of using the invention to convey a funny as a sequence of SMS-based picture messages, the SMS extension data is essentially frame concatenation data, and includes:

1. application type identifier (to indicate what is required at the receiving end for full display of the funny, including for example any special effects embedded in the funny);
2. the total number of SMS messages (not frames of the funny) used to convey the funny (which is not necessarily equal to the number of SMS messages for some of the frames);
3. a funny identifier (not necessarily unique);
4. the number or other identifier of the current frame (used by the receiving equipment to order the frames); and
5. the current SMS message of the frame (for the right order of SMS messages in each frame);
6. reserved for future use, such as for indicating a time stamp for a funny; and
7. a version number of the funny format being used.

A specific implementation for conveying a funny according to the preferred embodiment is as follows:

Byte 1: application type (e.g. funny application: 0×01);
Byte 2: number of total SMS messages;
Byte 3: application data 0 (funny identifier);
Byte 4: application data 1 (current frame);
Byte 5: application data 2 (current SMS of the frame);
Byte 6: application data 3 (future extensions); and
Byte 7: application data 4 (version number of the funny format).

The SMS extension data for a funny in some embodiments could also include instructions to the receiving equipment to exhibit special effects such as vibration when displaying a frame. In addition, the SMS extension data of one or more frames includes, in some embodiments, instructions for a frame or for the entire funny to self-destruct after some indicated date and time.

Context of the Invention

Figure 4:
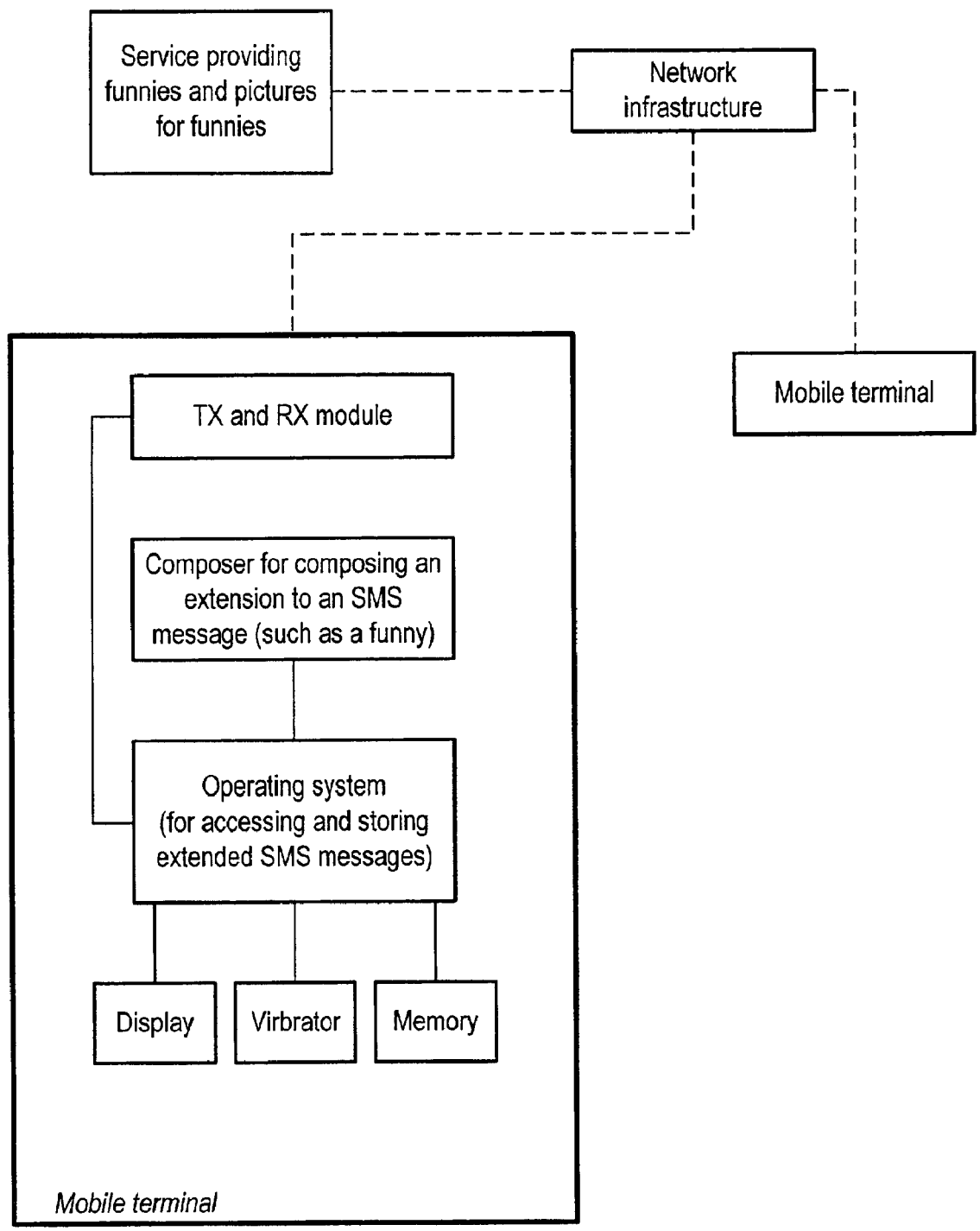
FIG. 4 is a block diagram of a system allowing a user of a mobile terminal to communicate a funny according to the invention.

Referring now to FIG. 4, a block diagram is provided of a system allowing a user using a mobile terminal (as part of the system) to communicate a message according to the invention. As shown in FIG. 4, besides including a transmitter and receiver module for receiving an extended SMS message or sequence of such messages as in case of a funny, a mobile terminal according to the invention includes a composer that enables a user to compose an extension to an SMS message, such as in creating a funny (the composing of a funny being done optionally by altering an existing funny or by pasting into the frames of the funny being created a picture downloaded from a service), a (non-volatile) memory for holding one or more extended SMS messages (such as funnies), a display (a screen) for displaying extended SMS messages (including for example displaying at least one frame of a funny at a time or for displaying an entire funny all at once in case of a mobile terminal having a wide display), and an operating system. The operating system inserts the SMS extension data into the user data field of SMS messages being extended according to the invention, and also interprets SMS extension data in received SMS messages. The operating system also provides for executing commands from a user to access to one or more extended SMS messages (including for example for accessing entire funnies) commands for editing, viewing, storing, and sending an extended SMS message or series of SMS messages in case of a funny, or for listing extended SMS message in memory (and in so doing preferably indicating all of the frames of a funny and all of the SMS messages that would be used to convey a single funny as a single unified object), and so on. The system also includes an electromechanical or piezoelectric device that is operative at the command of the operating system for vibrating the mobile terminal during display of an extended SMS message. In addition, the system includes a service for providing funnies that can be downloaded by a user into a mobile terminal and then altered to personalize them for use as a personal message to someone, or used as is.

Scope of the Invention

It is to be understood that the above-described arrangements are only illustrative of the application of the principles of the present invention. In particular, as mentioned above, the SMS extension data allows for encoding many different kinds of instructions to a mobile terminal adapted according to the invention, such as instructions for handling funnies, for handling encrypted text, for exhibiting special effects such as vibration when displaying an SMS picture message, and even for handling animated funnies, in which the picture of an SMS picture message is a motion picture. All of this is done, according to the invention as explained above, in a way that allows mobile terminals not adapted according to the invention to display at least part of an SMS picture message even though it is extended according to the invention, rather than simply signaling to a user that the mobile terminal has received a message it cannot display.

In addition, although the present invention has been shown and described as a way of extending the functionality of SMS picture messages, the invention is intended to comprehend appending messaging extension data not only to SMS picture messages, but to messages according to any format. As explained above, what the invention aims to provide is not merely an extension of the functionality of messages according to a given format or protocol, but an extension of the functionality of messages in such a way that older equipment, not adapted for the extended functionality, can at least display a message according to its original, non-extended functionality. Thus, the present invention comprehends providing message extension data at the end of messages encoded according to any predetermined format or protocol, including for example GRPS (General Radio Packet Service), I-Mode (wireless, continuous internet connection mobile phone), WAP (wireless access protocol) or 3G (third generation mobile phone) systems.

Finally, numerous modifications and alternative arrangements besides those indicated above may be devised by those skilled in the art without departing from the spirit and scope of the present invention, and the appended claims are intended to cover such modifications and arrangements.

What is claimed is:

1. A method for extending the functionality of a message according to a predetermined message format, for use when communicating one or more messages at least in part via a wireless communication system from a sending terminal to a receiving terminal, either of which may be a mobile terminal, the message format providing a user data field, the method comprising the steps of:
    a) determining a number of bits at the end of the user data field to be used to convey extension data;
    b) defining the information to be conveyed by each bit;
    c) inserting extension data into the user data field in the determined number of bits at the end of the user data field;
    wherein the extension data includes information indicating instructions associated with displaying the message, thereby providing an extension to the messaging according to the predetermined format that is effective for mobile terminals adapted to interpret the extension data but does not prevent mobile terminals not so adapted from displaying the message without regard for the instructions indicated by the extension data.

2. A method as in claim 1, wherein the message format is for a message including a picture, and wherein each picture message includes a picture and possibly some associated text, and wherein the method further comprises the steps of:
    a) inserting into the user data field at least some of the text to be associated with the picture; and
    b) inserting at least some of the picture into the user data field after the text.

3. The method of claim 1, wherein the predetermined message format is the short message service (SMS) picture message format.

4. The method of claim 3, wherein an ordered sequence of SMS picture messages is conveyed as a single message object logically organized into frames, each frame conveyed as one or more SMS picture messages, and wherein for frames of only one SMS picture message, the SMS extension data is included after the picture in the only one SMS picture message, but in each frame of multiple SMS picture messages, the SMS extension data is included after the picture in the last SMS picture message of the multiple SMS picture messages making up the frame.

5. The method of claim 4, wherein in case a frame is conveyed by more than one SMS message, the method further comprises the step of inserting SMS message concatenation data into the user data field of each SMS message used to convey the frame so as to indicate the individual SMS messages and their order to be used to convey the frame.

6. The method of claim 4, wherein the SMS extension data comprises: a message identifier and also the order number or other identifier of the current frame for use by the receiving terminal in ordering the frames of the multi-frame message.

7. The method of claim 6, wherein the SMS extension data further comprises the SMS message number of the SMS message to be used to convey a frame too long to be conveyed by a single SMS message.

8. An apparatus for sending and receiving a signal conveying a message according to a predetermined message format, but including information for extending the functionality of messaging according to the predetermined format, for use when communicating one or more messages at least in part via a wireless communication system from a sending terminal to a receiving terminal, either of which may be a mobile terminal, the message format providing a user data field, the apparatus comprising:
    a) means for sending and receiving the signal conveying the message; and
    b) means for inserting extension data into the user data field in the determined number of bits at the end of the user data field;

wherein the extension data includes information indicating instructions associated with displaying the message, thereby providing an extension to the messaging according to the predetermined format that is effective for mobile terminals adapted to interpret the extension data but does not prevent mobile terminals not so adapted from displaying the message without regard for the instructions indicated by the extension data.

9. An apparatus as in claim 8, wherein the message format is for a message including a picture, wherein each picture message includes some text associated with the picture, and wherein the apparatus further comprises:

a) means for inserting into the user data field at least some of the text to be associated with the picture; and b) means for inserting at least some of the picture into the user data field after the text.

10. The apparatus of claim 9, wherein the predetermined message format is the short message service (SMS) picture message format.

11. The apparatus of claim 10, wherein the signal conveys an ordered sequence of SMS picture messages as a single message object logically organized into frames, each frame conveyed as one or more SMS picture messages, and wherein for frames of only one SMS picture message, the SMS extension data is included after the picture in the only one SMS picture message, but in each frame of multiple SMS picture messages, the SMS extension data is included after the picture in the last SMS picture message of the multiple SMS picture messages making up the frame.

12. The apparatus of claim 11, wherein in case a frame is conveyed by more than one SMS message, the apparatus further comprises means for inserting SMS message concatenation data into the user data field of each SMS message used to convey the frame so as to indicate the individual SMS messages and their order to be used to convey the frame.

13. The apparatus of claim 11, wherein the SMS extension data comprises: a message identifier and also the order number or other identifier of the current frame for use by the receiving terminal in ordering the frames of the multi-frame message.

14. The apparatus of claim 13, wherein the SMS extension data further comprises the SMS message number of the SMS message to be used to convey a frame too long to be conveyed by a single SMS message.

* * * * *